US006935836B2

United States Patent
Ress, Jr. et al.

(10) Patent No.: US 6,935,836 B2
(45) Date of Patent: Aug. 30, 2005

(54) COMPRESSOR CASING WITH PASSIVE TIP CLEARANCE CONTROL AND ENDWALL OVALIZATION CONTROL

(75) Inventors: Robert Anthony Ress, Jr., Carmel, IN (US); Brian King, Greenwood, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 24 days.

(21) Appl. No.: 10/455,693

(22) Filed: Jun. 5, 2003

(65) Prior Publication Data

US 2005/0031446 A1 Feb. 10, 2005

Related U.S. Application Data

(60) Provisional application No. 60/386,469, filed on Jun. 5, 2002.

(51) Int. Cl.$^7$ ................................................ F01D 11/16
(52) U.S. Cl. ................................. 415/173.2; 415/209.2
(58) Field of Search ........................ 415/170.1, 173.1, 415/173.2, 173.7, 173.3, 173.4, 174.1, 174.2, 174.4, 209.2

(56) References Cited

U.S. PATENT DOCUMENTS

| 4,529,355 | A | 7/1985 | Wilkinson |
|---|---|---|---|
| 5,056,988 | A | 10/1991 | Corsmeier et al. |
| 5,127,797 | A | 7/1992 | Carman |
| 5,224,824 | A | 7/1993 | Eng |
| 5,297,932 | A | 3/1994 | Johnson |
| 5,462,403 | A | 10/1995 | Pannone |
| 5,487,642 | A | 1/1996 | Norton et al. |
| 5,618,161 | A | 4/1997 | Papageorgiou et al. |
| 5,653,581 | A | 8/1997 | Dixon et al. |
| 5,839,878 | A | 11/1998 | Maier |
| 6,062,813 | A | 5/2000 | Halliwell et al. |
| 6,095,750 | A | 8/2000 | Ross et al. |
| 6,109,868 | A | 8/2000 | Bulman et al. |
| 6,203,273 | B1 | 3/2001 | Weiner et al. |
| 6,382,905 | B1 * | 5/2002 | Czachor et al. .......... 415/173.2 |
| 6,464,232 | B1 | 10/2002 | Marchi et al. |
| 6,517,313 | B2 | 2/2003 | Rogers |
| 6,537,020 | B2 | 3/2003 | Humhauser |
| 2003/0012644 | A1 | 1/2003 | Dodd |

* cited by examiner

Primary Examiner—F. Daniel Lopez
Assistant Examiner—Richard A. Edgar
(74) Attorney, Agent, or Firm—Barnes & Thornburg LLP (57) ABSTRACT

A passive clearance control system for a gas turbine engine component. The system provides a blade shroud that is isolated from the component case and can move radially to maintain blade clearance. A plurality of vane sectors define a stator ring including a blade shroud. The stator ring and the control ring are coupled together and mounted within the component by a plurality of radial extending mounting members.

22 Claims, 7 Drawing Sheets

COMPRESSOR CASING WITH PASSIVE TIP CLEARANCE CONTROL AND ENDWALL OVALIZATION CONTROL

CROSS-REFERENCE TO RELATED APPLICATION

The present application claims the benefit of U.S. Provisional Patent Application No. 60/386,469 filed Jun. 5, 2002, which is incorporated herein by reference.

BACKGROUND OF THE INVENTION

The present invention relates generally to gas turbine engine compressor case designs. More particularly, one form of the present invention relates to a compressor case including a mechanical arrangement that provides both passive tip clearance control and endwall ovalization control. Although the present invention was developed for application in a gas turbine engine compressor, applications in other components of the gas turbine engine are contemplated herein.

Tip clearance has been shown to be a significant factor influencing compressor performance. Current design trends attempt to control tip clearance to span ratios on the order of about one to two percent at the rear of the compressor. Tip clearance levels above this range can seriously affect compressor efficiency and stall margin.

A variety of compressor case designs have been employed in previous gas turbine engines over the years. These designs include a full hoop compressor case, a horizontally split compressor case, a single wall compressor case, a dual wall compressor case and a triple wall compressor case. Each of these prior designs has been found to affect tip clearance in unique ways.

A single wall horizontally split compressor case has been widely utilized in gas turbine engine compressors for its simplicity and low cost. The horizontally split compressor case introduces endwall ovalization into the system due to the non-axisymmetric nature of the casing. The single wall case leaves only the casing material selection (and subsequent coefficient of thermal expansion) as a design variable affecting tip clearance. As a result of these limitations, the majority of current production engines avoid single wall horizontally split compressor cases.

Dual wall compressor cases have been utilized in many military and commercial gas turbine engine applications. The dual wall compressor cases are typically configured with a split outer flowpath hung off of the outer compressor casing through hooks and in some cases a wishbone shaped diaphragm. The outer casing can be of a full hoop type, see for example U.S. Pat. No. 5,180,281, or of the horizontally split type. While dual wall compressor cases have provided improved tip clearance and ovalization control relative to a single wall compressor case, additional improvement has been sought through the application of complex triple wall compressor cases.

Although many of the prior compressor case designs have been steps in the right direction, there still remains a need for additional improvement. The present inventions satisfy this need in a novel and non-obvious way.

SUMMARY OF THE INVENTION

One form of the present invention contemplates a gas turbine engine apparatus, comprising: a mechanical housing; a first rotor with a plurality of first blades located within the mechanical housing and rotatable about a centerline, each of the plurality of first blades including a first tip; a control ring located within and spaced from the mechanical housing; a plurality of locating members fixedly coupled with the mechanical housing and slidably coupled with the control ring, the plurality of locating members positioning the control ring relative to the mechanical housing; a non-rotatable ring with a plurality of vanes located within the mechanical housing and axially spaced from the first rotor, wherein the non-rotatable ring includes a tip shroud portion spaced from the first tips of the plurality of first blades, and wherein the non-rotatable ring is fixedly coupled with the control ring and moveable therewith; and, wherein relative motion may occur between the control ring and at least one of the plurality of locating members.

Another form of the present invention contemplates a gas turbine engine apparatus, comprising: a case; a rotatable first rotor with a plurality of circumferentially spaced first blades located within the case and about a centerline, each of the plurality of first blades including a first tip; a control ring located within and spaced radially from the case; a plurality of radial mounting members fixedly connected with the case, each of the plurality of radial mounting members extending radially and slidably engaging an opening in the control ring, wherein the plurality of locating members positioning the control ring relative to the case; and, a plurality of vane sectors mounted in a substantially adjacent relationship within the case to form a non-rotatable ring axially spaced from the first rotor, each of the plurality of vane sectors includes an inner endwall and an outer endwall with at least one vane located between the endwalls, wherein each of the outer endwalls has an extension member extending therefrom including a shroud portion and a coupling portion, wherein each of the shroud portions extending along and spaced radially from the first tips and each of the coupling portions fixedly coupled with the control ring, and the plurality of vane sectors and the control ring are moveable together; and, wherein relative radial motion may occur between at least one of the radial mounting members and the control ring.

Yet another form of the present invention contemplates a gas turbine engine apparatus, comprising: a horizontally split case; a first rotor with a plurality of first blades located within the case and rotatable about a centerline, each of the plurality of first blades including a first tip; a non-rotatable ring with a plurality of vanes located within the case and axially spaced from the first rotor, wherein the non-rotatable ring includes a tip shroud portion spaced radially from the first tips; a control ring located within and radially spaced from the case, the control ring is fixedly coupled with the non-rotatable ring and defines a first assembly; and, locating means for mechanically isolating the first assembly from the case, wherein the locating means fixes the first assembly in an axial position relative to the case and in a first condition holds the first assembly in a first radial position and in a second condition allows radial movement of the first assembly.

Yet another form of the present invention contemplates a compressor passive clearance control system. The system comprising: a compressor case having a flowpath for working fluid flow; a rotatable first rotor with a plurality of circumferentially spaced first blades located within the case and about a centerline, each of the plurality of first blades is disposed within the flowpath and includes a first tip; a rotatable second rotor with a plurality of circumferentially spaced second blades located within the case and about the centerline, each of the plurality of second blades is disposed within the flowpath and includes a second tip; a control ring located within the case; a plurality of radial mounting members fixedly connected with the case, each of the plurality of radial mounting members extending radially and slidably engaging an opening in the control ring, wherein the plurality of locating members positioning the control ring relative to case; and a plurality of vane sectors mounted in a substantially adjacent relationship within the case to form a non-rotatable ring axially spaced from the first rotor, each of the plurality of vane sectors includes an inner endwall and an outer endwall with at least one vane located between the endwalls and within the flowpath, wherein each of the outer endwalls has a fore extension member and an aft extension member, the fore extension member extending from the outer endwall and including a fore shroud portion and a fore coupling portion, wherein each of the fore shroud portions extending along and spaced radially from the first tips and each of the fore coupling portions fixedly coupled with a first portion of the control ring, and wherein the aft extension member extending from the outer endwall and including an aft shroud portion and an aft coupling portion, wherein each of the aft shroud portions extending along and spaced radially from the second tips and each of the aft coupling portions fixedly coupled with a second portion of the control ring, and the plurality of vane sectors and the control ring are moveable together; a working fluid bleed to direct a portion of working fluid from the flowpath across the control ring; and wherein relative radial motion may occur between at least one of the radial mounting members and the control ring.

One object of the present invention is to provide a unique passive clearance control system.

Related objects and advantages of the present invention will be apparent from the following description.

DESCRIPTION OF THE PREFERRED EMBODIMENT

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
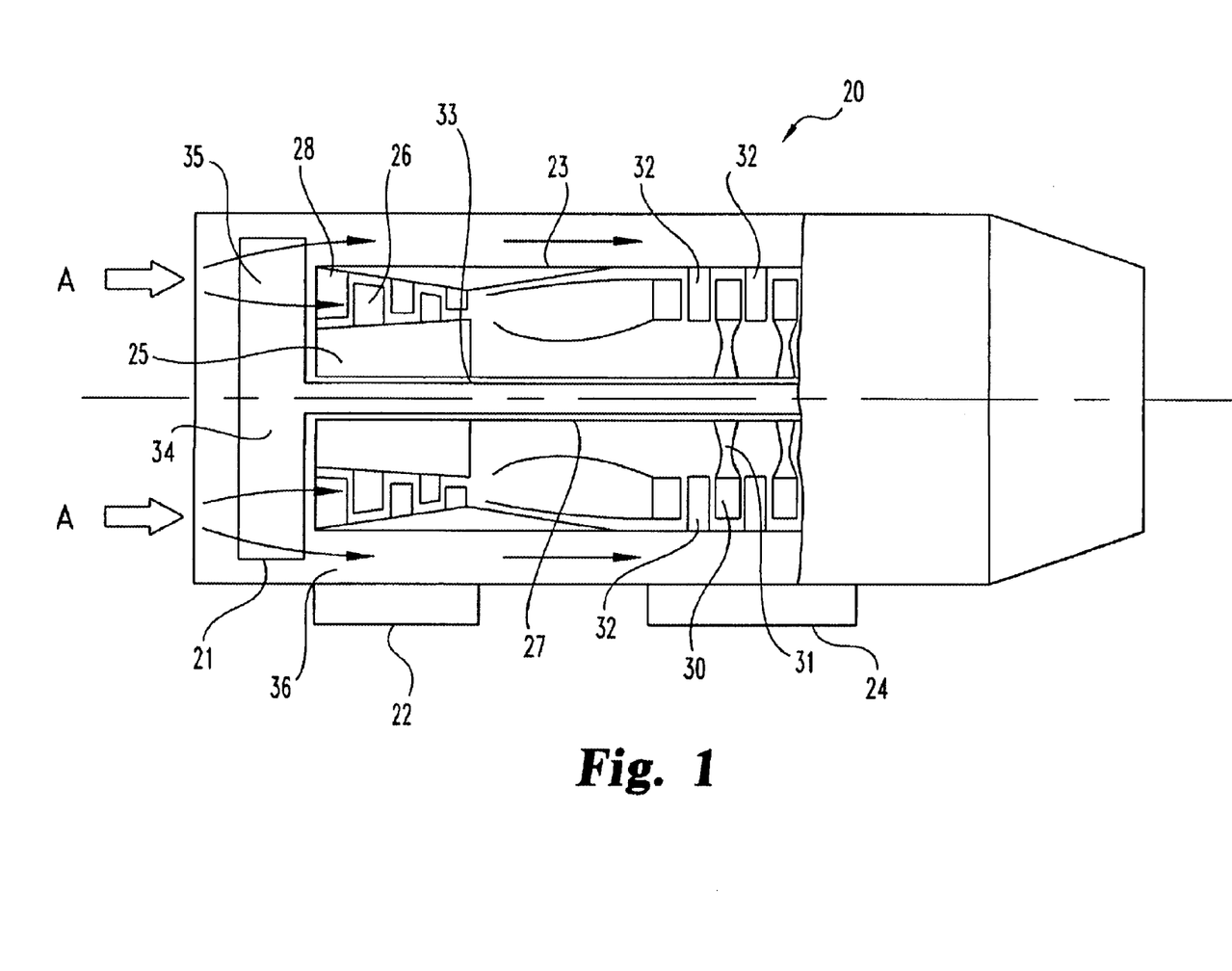
FIG. 1 is an illustrative sectional view of a typical gas turbine engine.
Figure 2:
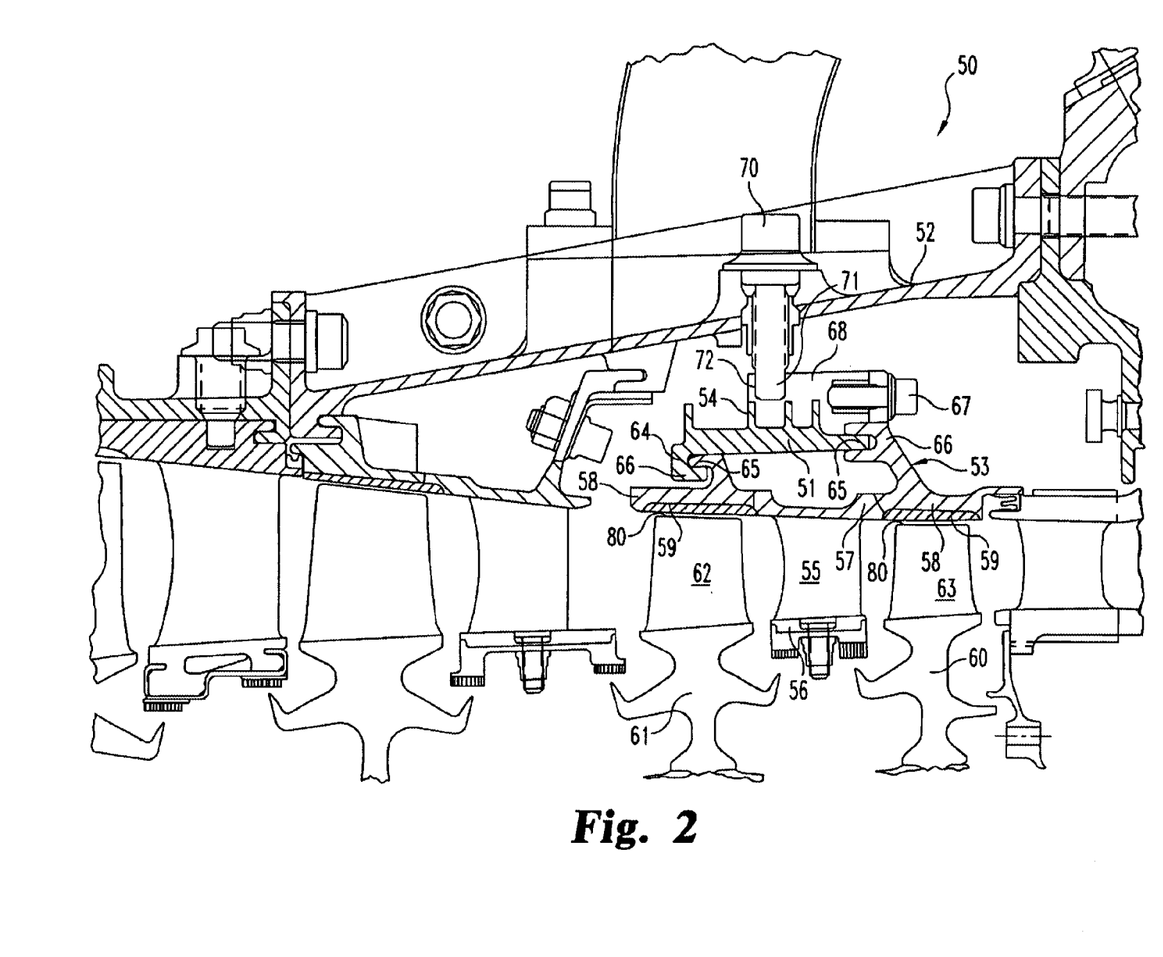
FIG. 2 is a sectional view through a compressor portion of a gas turbine engine illustrating a passive clearance control system comprising one aspect of the present invention.
Figure 3:
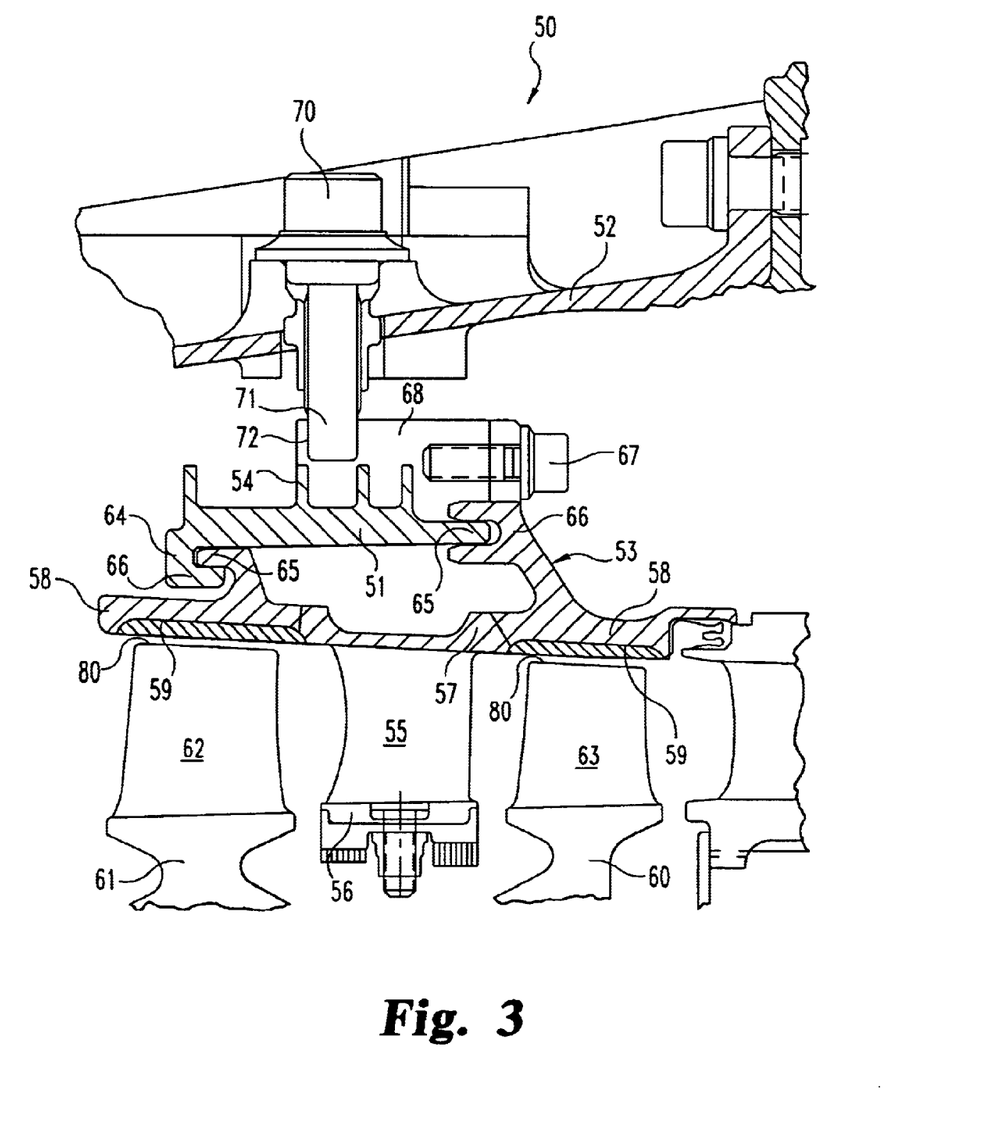
FIG. 3 illustrates an enlarged view of the passive clearance control system of FIG. 2.
Figure 4:
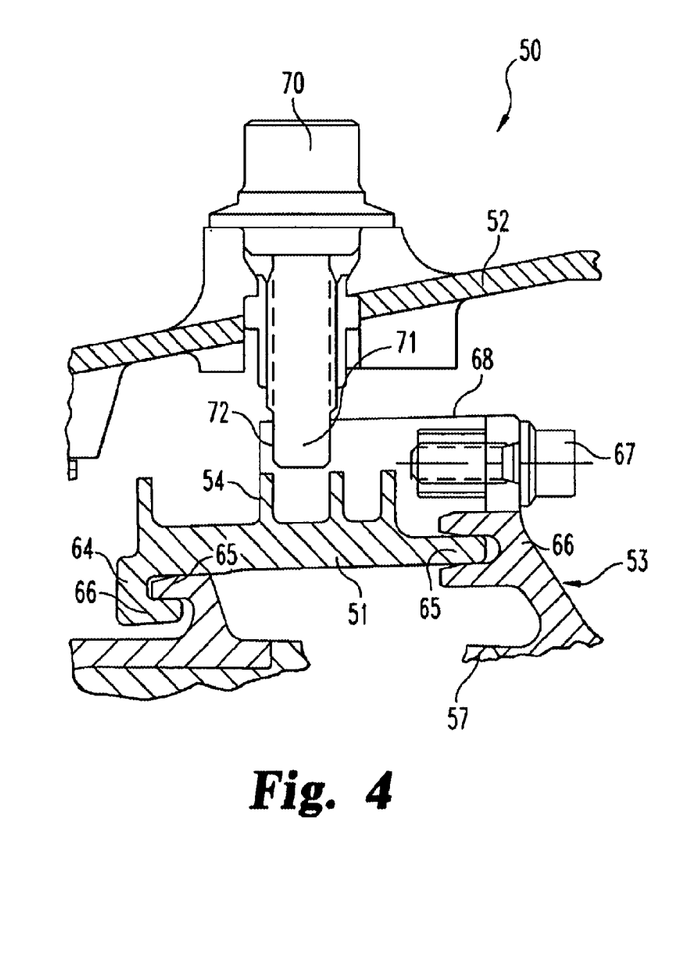
FIG. 4 illustrates the passive clearance control system of FIG. 2 with much of the surrounding compressor components removed.
Figure 5:
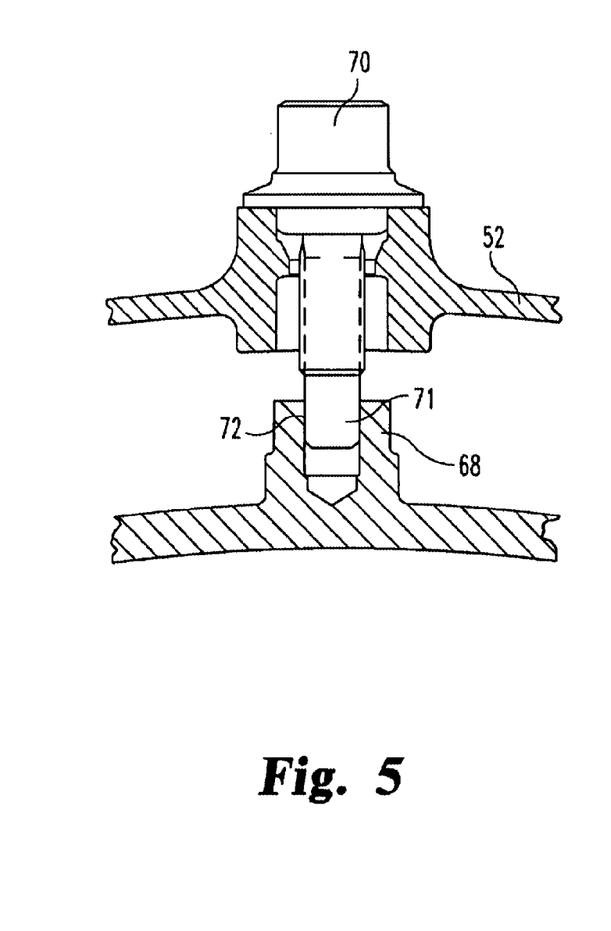
FIG. 5 illustrates a sectional end view of a portion of the passive clearance control system of FIG. 2.

Referring to FIG. 1, there is illustrated a gas turbine engine 20 which includes a fan section 21, a compressor section 22, a combustor section 23, and a turbine section 24 that are integrated together to produce an aircraft flight propulsion engine. This type of gas turbine engine is generally referred to as a turbo-fan. One alternate form of a gas turbine engine includes a compressor, a combustor, and a turbine that have been integrated together to produce an aircraft flight propulsion engine without the fan section. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

A gas turbine engine is equally suited to be used for an industrial application. Historically, there has been widespread application of industrial gas turbine engines, such as pumping sets for gas and oil transmission lines, electricity generation, and naval propulsion.

The compressor section 22 includes a rotor 25 having a plurality of compressor blades 26 coupled thereto. The rotor 25 is affixed to a shaft 27 that is rotatable within the gas turbine engine 20. A plurality of compressor vanes 28 are positioned within the compressor section 22 to direct the fluid flow relative to blades 26. Turbine section 24 includes a plurality of turbine blades 30 that are coupled to a rotor disk 31. The rotor disk 31 is affixed to the shaft 27, which is rotatable within the gas turbine engine 20. Energy extracted in the turbine section 24 from the hot gas exiting the combustor section 23 is transmitted through shaft 27 to drive the compressor section 22. Further, a plurality of turbine vanes 32 are positioned within the turbine section 24 to direct the hot gaseous flow stream exiting the combustor section 23.

The turbine section 24 provides power to a fan shaft 33, which drives the fan section 21. The fan section 21 includes a fan 34 having a plurality of fan blades 35. Air enters the gas turbine engine 20 in the direction of arrows A and passes through the fan section 21 into the compressor section 22 and a bypass duct 36. Further details related to the principles and components of a conventional gas turbine engine will not be described herein as they are believed known to one of ordinary skill in the art.

With reference to FIGS. 2–8, there is illustrated a compressor case system 50 that in one form incorporates a mechanical arrangement that provides passive tip clearance control and endwall ovalization control; a passive clearance control system. One element of the compressor case system 50 is a control ring 51, which interfaces with the compressor case 52 and the plurality of vane sectors 53. The plurality of vane sectors 53 is mounted in substantially adjacent relationship to form a circular ring. The compressor case can be a 360° case or a split case. In a preferred form of the present application the compressor outer case 52 is defined by a horizontally split case. The control ring 51 is a continuous 360-degree ring that is isolated from and structurally independent from the compressor case 52. In one form the control ring 51 is an integrally formed component and in another form the control ring is an assembly of subcomponents into the 360 degree ring. The control ring 51 thickness is preferably held to a minimum in order to reduce weight, however thickness greater than the minimum are contemplated herein. The thickness and weight may be dependent upon design loads and material selections utilized for the components. In one aspect of the present application the control ring 51 material is one of titanium, low expansion nickel, titanium aluminide, titanium metal matrix composites and ceramic matrix composites. In one form of the control ring the thickness is within a range of about 0.060 inches to about 0.150 inches, however, other control ring thickness and materials are contemplated herein. Stiffness of the control ring 51 is increased in one form through the introduction of integral ribs 54. In one form there are a plurality of axially spaced ribs 54 extending circumferentially around the control ring 51. Further, the present application contemplates a passive clearance control system with no ribs 54 and other passive clearance control systems with other quantities and/or location for the ribs.

A plurality of vane sectors 53 is coupled with the control ring 51. In one aspect each of the plurality of vane sectors 53 comprise at least one vane airfoil 55 disposed between an inner endwall 56 and outer endwall 57. The present application contemplates one or a plurality of vane airfoils 55 disposed between the inner and outer endwalls 56, 57. The outer endwall 57 includes at least one extension 58 that forms a tip shroud 59 above an adjacent rotor stage 60 with a plurality of blades 63 or above an adjacent rotor stage 61 with a plurality of blades 62. In one preferred form the outer endwall 57 includes fore and aft extensions 58 that form tip shrouds 59 above the adjacent rotor stage 60 with plurality of blades 63 and above the adjacent rotor stage 61 with plurality of blades 62. The extensions 58 can be integrally formed with the outer endwall 57 of the vane sector 53 by casting, or can be a separate component that is joined to the outer endwall 57. In one form the extensions 58 are joined to the outer endwall 57 by welding. In one form of the present application an abradable coating is applied to the inner surface of the extensions 58 and allows for tighter operating clearances and blade tip to shroud rubbing during initial transient or extreme maneuver conditions. Further, in another form of the present application there are contemplated extensions 58 without an abradable coating applied thereto proximate the blade tips.

Each of the plurality of vane sectors 53 are coupled to the fore end 64 and the aft end 65 of the control ring 51 through a circular rail arrangements 66. The circular rail arrangements 66 can be of a continues 360° form, or can be of a localized spaced form. At least one fastener 67 provides axial retention between each of the vane sectors 53 and the control ring 51. In a preferred form a plurality of fasteners provide axial retention between the plurality of vane sectors 53 and the control ring 51. In one form each of the plurality of fasteners 67 are a threaded fastener that engages with an internally threaded aperture formed on the control ring 51. In the embodiment illustrated in FIGS. 2–8, the control ring 51 includes a plurality of spaced mounting bosses 68 having an internally threaded aperture to receive the threaded fastener 67. However, the present invention contemplates other types of fasteners for providing axial retention between the vane sectors and the control ring.

Figure 6:
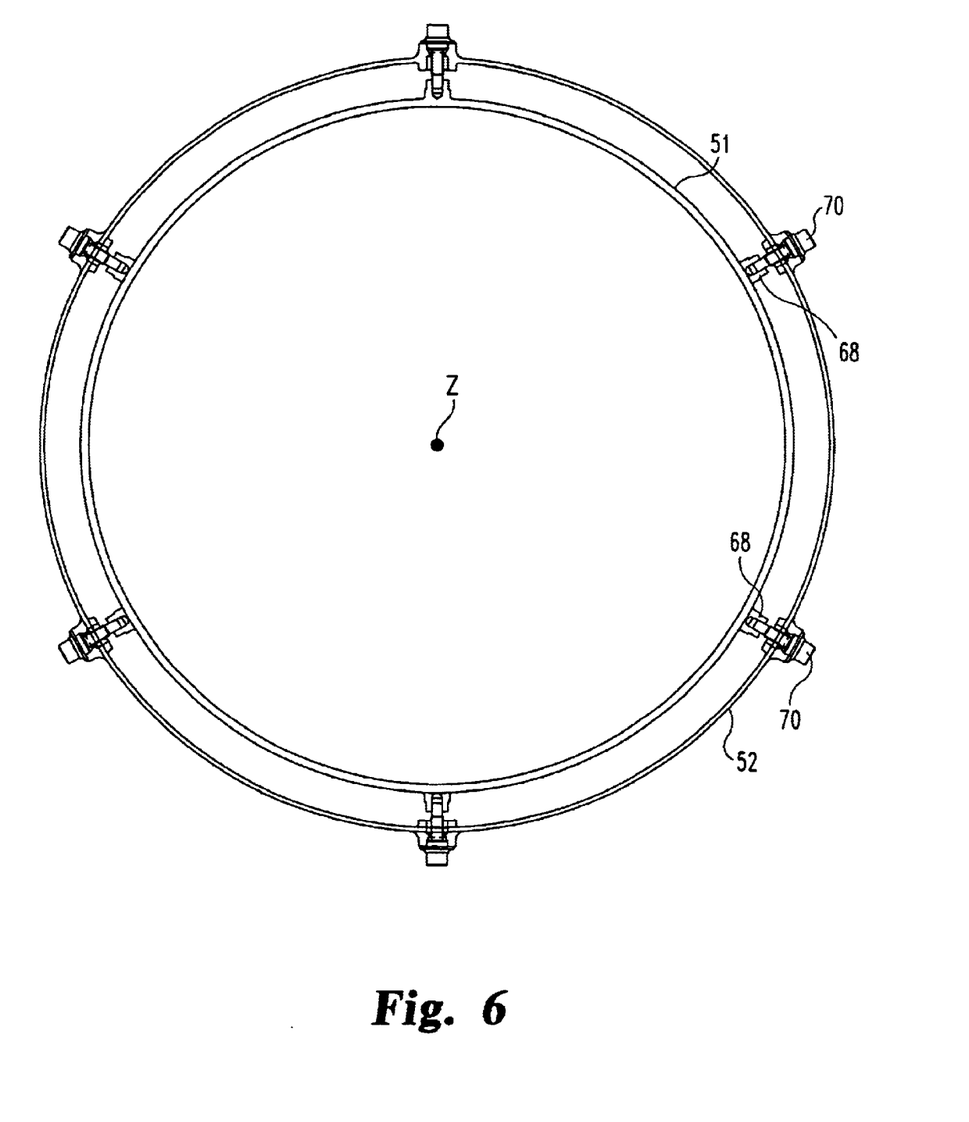
FIG. 6 is an illustrative end view showing a plurality of locating pins comprising a portion of the passive clearance control system of FIG. 2.

The control ring 51 and plurality of vane sectors 53 are positioned relative to the compressor outer casing 52 by a plurality of radial-mounting members 70. In one from of the present application a bolt defines each of the radial-mounting members. However, the present application is not limited to bolts unless specifically stated to the contrary and other types of radial-mounting members are contemplated herein. The threaded portion of the bolt 70 engages with an internally threaded opening in the case 52 and a pin extension 71 extends from the tip of the radial mounting member 70. The pin extension 71 extends from the tip of the radial-mounting member 70 and engages a hole 72 in the outer perimeter of the control ring 51. The pin extension 71 is sized to allow sliding movement within the hole 72. In a preferred form the hole 72 is formed in the mounting bosses 68. The radial-mounting members 70 axially position the control ring 51 and the plurality of vane sectors 53 relative to the compressor case 52. Further, the radial-mounting members 70 function to substantially center the control ring 51 and the plurality of vane sectors 53 relative to the compressor case 52 and the engine centerline Z. With reference to FIG. 6, there is illustrated a plurality of radial-mounting members 70 for mounting the control ring 51 and the plurality of vane sectors 53 to the compressor case 52. As a result of this mounting arrangement, the control ring 51 and plurality of vane sectors 53 are isolated from the compressor outer case 52.

Distortion in the compressor outer case 52 arising from non-axisymmetric thermal gradients or non-axisymmetric geometric features (example horizontal split line flanges, bosses, etc.) is not transmitted to the control ring 51 and plurality of vane sectors 53 because of the relative radial movement between the control ring and the pin extension 71. A growth differential between the control ring 51 and the case 52 will result in relative sliding motion between the control ring 51 and the radial-mounting member 70. Thereby maintaining the endwall 57 above the rotor blade tips 80 round and allowing for tighter tip running clearances. In one form of the present application the relative radial movement between the control ring and the radial-mounting member substantially corresponds with the relative radial movement between the blade shroud and the blade tips.

Figure 8:
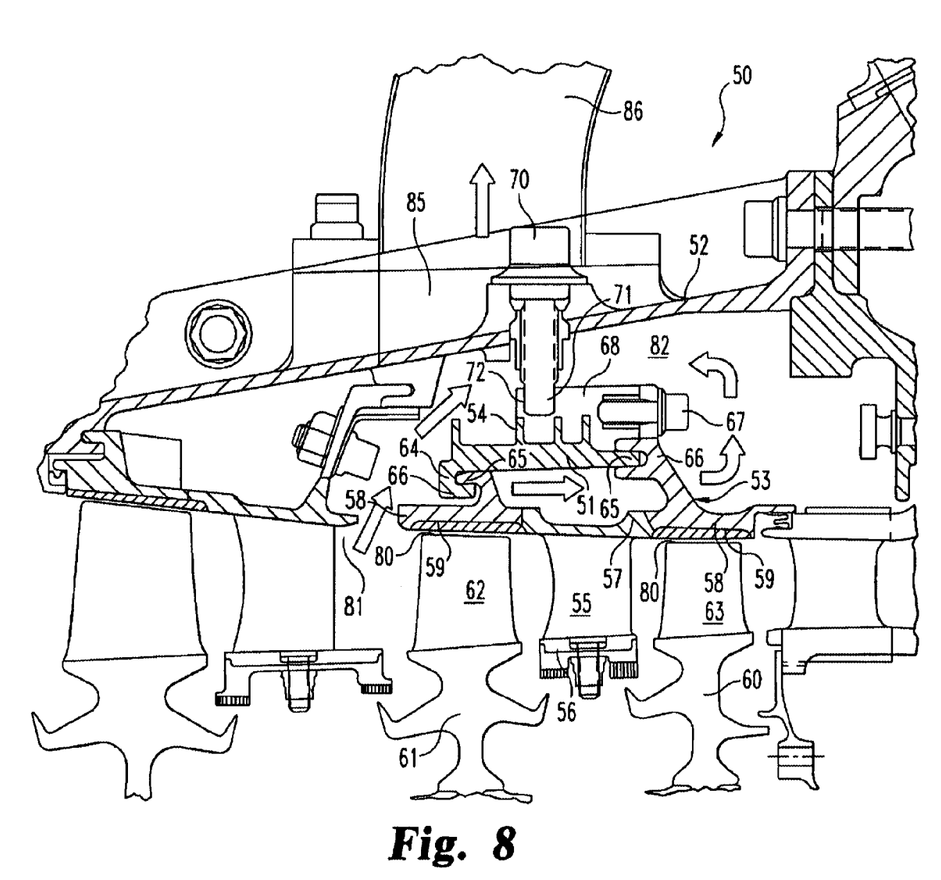
FIG. 8 is an illustrative view of the passive clearance control system of FIG. 2 showing the flow of compressor bleed air through the passive clearance control system.

With reference to FIG. 8, there is illustrated an axial gap 81 in the flowpath outer endwall portion that provides a mid-compressor bleed for starting and low pressure turbine cooling. The present application contemplates that the bleed can be a 360° bleed or a localized bleed. The axial gap 81 provides for a mid-compressor bleed from which bleed air is directed into the annulus 82 which houses the control ring 51 of the passive clearance control system. The bleed air flows around the control ring 51 before entering a plurality of ports 85 through the compressor outer casing 52. A plurality of bleed tubes 86 direct the bleed air flow to the turbine area of the engine.

The bleed air flows across the control ring 51 to maintain the ring at a relatively constant temperature. The temperature of the control ring 51 is maintained at a level relatively close to the flowpath temperature at the bleed site. This allows the control ring 51 to respond quickly to changes in flowpath temperature. As a result, the control ring 51 growth substantially tracks with the rotor blade tip 80 growth and therefore tip clearances can be held tight over a wide operating range including take-off, climb and cruise.

In one form of the present application where it is desirable to slow the thermal response of the control ring 51, baffles are incorporated into the system to divert flow away from the control ring 51. In another form of the present application, valves are utilized to control the flow of bleed air through the bleed tubes 86 thereby throttling air flow at select conditions to slow the thermal response of the control ring 51. A likely condition in which the flow of bleed air through the bleed tubes 86 would be controlled is during a snap deceleration when it is desirable for the tip shroud to remain at a high diameter thereby eliminating the closedown of the tip shroud onto the rotor blade tips.

In one from the vane sectors 53 are preferably formed in arcs within a range of about 30 to 60 degrees. The selection of vane sectors within this range substantially minimizes the local distortion of the control ring as the vane sectors 53 attempt to distort in response to thermal conditions. The present application contemplates vane sectors with other arc angles, however the preferred arc range allows a number of desirable vane sector designs-six 60 degree sectors, eight 45 degree sectors, ten 36 degree sectors, and twelve 30 degree sectors. In deciding upon a vane sector arc a number of design factors are contemplated including 3D transient tip clearance analysis results, leakage analysis results, part count goals and cost goals.

Figure 7:
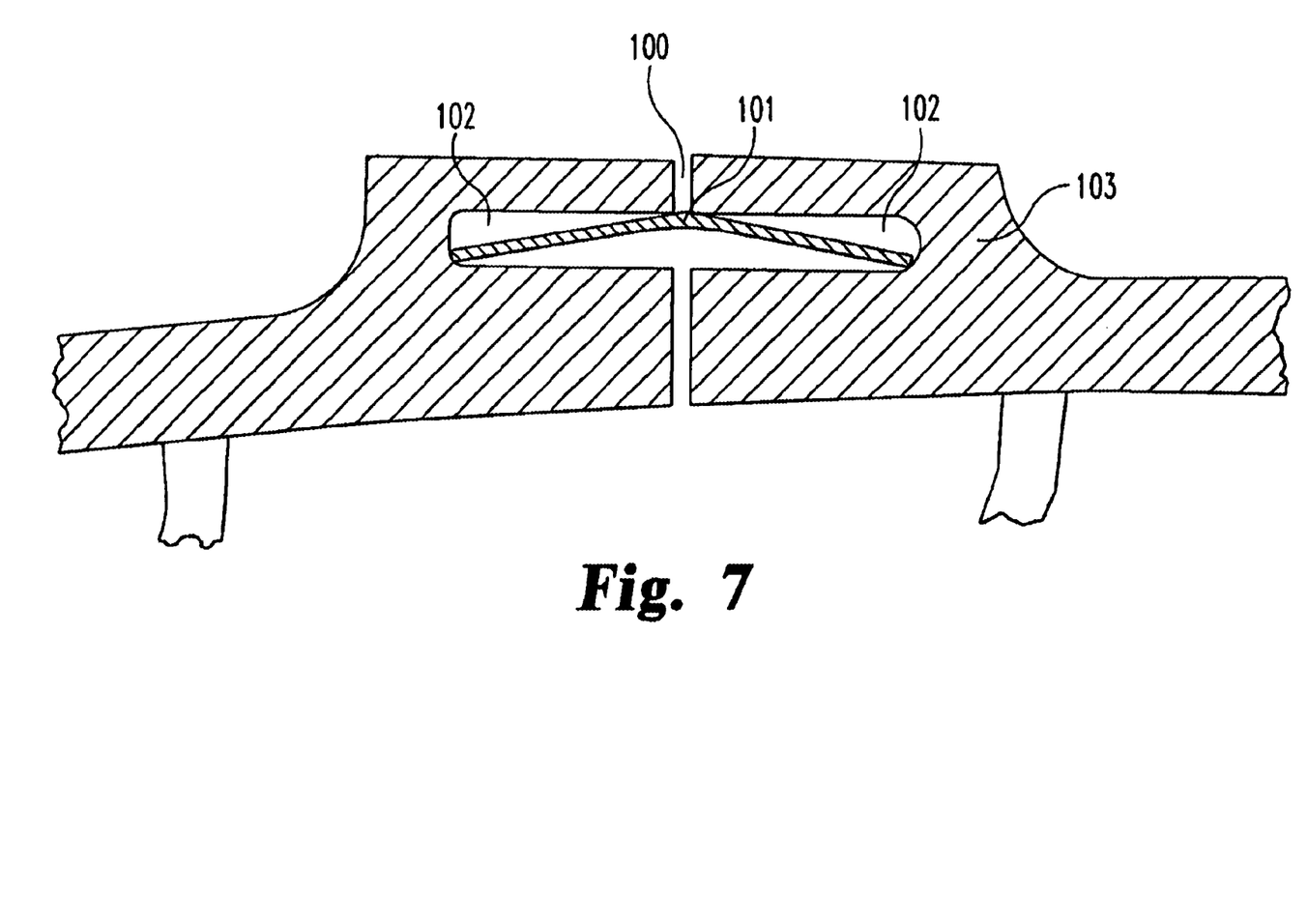
FIG. 7 is an illustrative view of a seal between adjacent vane segments.

With reference to FIG. 7, there is illustrated that in one form of the present application gaps 100 are maintained between adjacent vane sectors 53 to allow for thermal expansion. A minimum gap is designed for most severe design condition, and the minimum gap is preferably within the range of about 0.005 to about 0.020 inches, however other gap sizes are contemplated herein including one form with substantially no gap. A sheet metal strip seal 101 is incorporated into the system to prevent leakage at the the flowpath outer endwall 57 between adjacent vane sectors 53. Strip seal 101, is located within opposed slots 102 of adjacent vane sectors 53. The strip seal 101 runs the entire length of the vane sector 53. In one form the vane sector 53 is locally thickened at 103 to accommodate the slot 102.

The assembly of the passive clearance control and endwall ovalization control system 50 starts with the buildup of the rotor system. After rotor assembly, vane sectors 53 with strip seals 101 are placed around the rotor. The control ring 51 is slid axially atop the vane sectors 53 and the circular rail arrangements 66 are engaged. The plurality of fasteners 67 is installed to lock the vane sectors 53 to the control ring 51. At the appropriate time in the specific engine build sequence, the outer compressor casing 52 is installed. Finally, the radial-mounting members 70 that locate the control ring 51 relative to the outer case 52 are installed.

While the system previously described herein shows predominately a plurality of vane sectors 53 including a fore extension 58 and an aft extension 58 forming tip shrouds 59 above two adjacent rotor stages 60, 61 and mounted to a single control ring 51, other arrangements are contemplated herein. In one alternate embodiment a vane sector includes only a single extension, fore or aft, forming a tip shroud over only one rotor only. Multiple vane stages could be joined in a sectored format and mounted to one or more control rings.

The passive clearance control and endwall ovalization control system described herein is compatible with both conventional and advanced material systems. Vane sectors can utilize titanium, nickel, titanium aluminide, or monolithic ceramic materials. Combinations of these materials, such as nickel airfoils with titanium aluminide endwalls, are also applicable. Control ring material options include titanium, low expansion nickel, titanium aluminide, titanium MMC's and CMC's. Selection of the control ring material would be linked to the selection of the rotor material, since the coefficient of thermal expansion of these two systems ultimately control tip clearance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A gas turbine engine apparatus, comprising:

a mechanical housing;

a first rotor with a plurality of first blades located within said mechanical housing and rotatable about a centerline, each of said plurality of first blades including a first tip;

a control ring located within and spaced from said mechanical housing;

a plurality of locating members fixedly coupled with said mechanical housing and slidably coupled with said control ring, said plurality of locating members positioning said control ring relative to said mechanical housing;

a non-rotatable ring with a plurality of vanes located within said mechanical housing and axially spaced from said first rotor, wherein said non-rotatable ring includes a tip shroud portion spaced from said first tips of said plurality of first blades, and wherein said non-rotatable ring is fixedly coupled with said control ring and moveable therewith; and wherein relative motion may occur between said control ring and at least one of said plurality of locating members.

2. The apparatus of claim 1, wherein said control ring includes a fore end and an aft end, and wherein said non-rotatable ring includes an engagement portion that engages with one of said fore end and said aft end.

3. The apparatus of claim 2, wherein said engagement portion includes a circular rail arrangement that mates with one of said fore end and said aft end.

4. The apparatus of claim 1, wherein said mechanical housing includes a flowpath, and which further includes means for exposing said control ring to working fluid from said flowpath.

5. The apparatus of claim 1, wherein said control ring includes at least one circumferential stiffening rib.

6. The apparatus of claim 1, wherein each of said plurality of locating members extending inwardly in a radial orientation from said mechanical housing, and wherein said relative motion is in a radial direction.

7. The apparatus of claim 6, wherein each of said plurality of locating members includes a threaded portion that attaches with said mechanical housing to fixedly couple said locating member with said mechanical housing, and wherein each of said locating members include a pilot portion that allows for relative sliding movement between said control ring and said pilot portion.

8. The apparatus of claim 1, wherein said non-rotatable ring is formed of a plurality of adjacent vane sectors, wherein each of said plurality of vane sectors defines an arc of about 30° to about 60°, and wherein said control ring is an integral 360° ring.

9. The apparatus of claim 1, wherein said control ring includes a fore end and an aft end;
   wherein said non-rotatable ring includes a circular rail engagement portion that mates with one of said fore end and said aft end;
   which further includes a plurality of fasteners, wherein said plurality of fasteners attach said non-rotatable ring to said control ring proximate said engagement portion;
   wherein each of said plurality of locating members extending inwardly in a radial direction from said mechanical housing; and
   wherein said relative motion is in a substantially radial direction.

10. The apparatus of claim 9, wherein said non-rotatable ring is formed from a plurality of adjacent vane sectors, and wherein each of said plurality of locating members includes a threaded portion that engages with said mechanical housing to fixedly couple said locating member with said mechanical housing, and wherein each of said locating members includes a pilot portion that allows relative sliding movement between said control ring and said pilot portion.

11. A gas turbine engine apparatus, comprising:
   a case;
   a rotatable first rotor with a plurality of circumferentially spaced first blades located within said case and about a centerline, each of said plurality of first blades including a first tip;
   a control ring located within and spaced radially from said case;
   a plurality of radial mounting members fixedly connected with said case, each of said plurality of radial mounting members extending radially and slidably engaging an opening in said control ring, wherein said plurality of locating members positioning said control ring relative to case; and
   a plurality of vane sectors mounted in a substantially adjacent relationship within said case to form a non-rotatable ring axially spaced from said first rotor, each of said plurality of vane sectors includes an inner endwall and an outer endwall with at least one vane located between said endwalls, wherein each of said outer endwalls has an extension member extending therefrom including a shroud portion and a coupling portion, wherein each of said shroud portions extending along and spaced radially from said first tips and each of said coupling portions fixedly coupled with said control ring, and said plurality of vane sectors and said control ring are moveable together, and
   wherein relative radial motion may occur between at least one of said radial mounting members and said control ring.

12. The apparatus of claim 11, wherein said plurality of radial mounting members substantially prevents axial movement of said control ring and said non-rotatable ring, and wherein said case is a horizontally split case.

13. The apparatus of claim 11, wherein said control ring includes a first engagement portion and a second engagement portion, and wherein each of said coupling portions engage with one of said engagement portions; and
   which further includes a plurality of fasteners that hold said control ring to said non-rotatable ring.

14. The apparatus of claim 13, wherein each of said shroud portions includes an abradable coating;
   wherein each of said plurality of vane sectors defines an arc between about 30° and about 60°.

15. The apparatus of claim 14, wherein said plurality of radial mounting members are spaced around the periphery of said case at a constant axial position; and
   wherein said radial mounting members include a threaded portion for engaging said case and an extension portion that is slideable relative to said opening in said control ring.

16. The apparatus of claim 11, wherein said control ring includes a plurality of axial spaced circumferentially extending stiffening ribs.

17. The apparatus of claim 11, wherein said case is a horizontally split case having a flowpath for a working fluid;
   which further includes a bleed to acquire a quantity of working fluid from said flowpath and direct the quantity of working fluid across said control ring;
   wherein said control ring includes a first engagement portion and a second engagement portion, and wherein each of said coupling portions engage with one of said engagement portions;
   which further includes a plurality of fasteners that hold said control ring to said non-rotatable ring; and
   wherein each of said vane sectors define an arc between about 30° and about 60°.

18. The apparatus of claim 17, which further includes means for controlling the flow of the quantity of working fluid from said flowpath and across said control ring.

19. The apparatus of claim 11, wherein said case includes a flowpath, and which further includes means for exposing said control ring to working fluid from said flowpath.

20. A compressor passive clearance control system, comprising:
   a compressor case having a flowpath for working fluid flow;
   a rotatable first rotor with a plurality of circumferentially spaced first blades located within said case and about a centerline, each of said plurality of first blades is disposed within said flowpath and includes a first tip;
   a rotatable second rotor with a plurality of circumferentially spaced second blades located within said case and about said centerline, each of said plurality of second blades is disposed within said flowpath and includes a second tip;
   a control ring located within said case;
   a plurality of radial mounting members fixedly connected with said case, each of said plurality of radial mounting members extending radially and slidably engaging an opening in said control ring, wherein said plurality of locating members positioning said control ring relative to case; and
   a plurality of vane sectors mounted in a substantially adjacent relationship within said case to form a non-rotatable ring axially spaced from said first rotor, each of said plurality of vane sectors includes an inner endwall and an outer endwall with at least one vane located between said endwalls and within said flowpath, wherein each of said outer endwalls has a fore extension member and an aft extension member, said fore extension member extending from said outer endwall and including a fore shroud portion and a fore coupling portion, wherein each of said fore shroud portions extending along and spaced radially from said first tips and each of said fore coupling portions fixedly coupled with a first portion of said control ring, and wherein said aft extension member extending from said outer endwall and including an aft shroud portion and an aft coupling portion, wherein each of said aft shroud portions extending along and spaced radially from said second tips and each of said aft coupling portions fixedly coupled with a second portion of said control ring, and said plurality of vane sectors and said control ring are moveable together, a working fluid bleed to direct a portion of working fluid from said flowpath across said control ring; and wherein relative radial motion may occur between at least one of said radial mounting members and said control ring.

21. The system of claim 20, wherein relative radial motion may occur between each of said plurality of radial mounting members and said control ring.

22. The system of claim 21, wherein each of said plurality of radial mounting members is connected with said case by threads, and each of said plurality of radial mounting members include a pilot portion that is disposed in a sliding non-interference fit with said opening in said control ring.

* * * * *